(12) United States Patent
Caidar et al.

(10) Patent No.: US 9,032,447 B1
(45) Date of Patent: May 12, 2015

(54) METHOD AND APPARATUS FOR INTERFACING BUYERS WITH PRODUCTS DEPICTED IN A VIDEO

(71) Applicants: Allon Caidar, San Diego, CA (US); David Caidar, San Diego, CA (US)

(72) Inventors: Allon Caidar, San Diego, CA (US); David Caidar, San Diego, CA (US)

( * ) Notice: Subject to any disclaimer, the term of this patent is extended or adjusted under 35 U.S.C. 154(b) by 0 days.

(21) Appl. No.: 14/473,942

(22) Filed: Aug. 29, 2014

(51) Int. Cl.
| | |
|---|---|
| G06F 3/00 | (2006.01) |
| G06F 13/00 | (2006.01) |
| H04N 5/445 | (2011.01) |
| H04N 7/173 | (2011.01) |
| H04N 21/478 | (2011.01) |
| H04N 21/81 | (2011.01) |
| H04N 9/70 | (2006.01) |
| H04N 5/262 | (2006.01) |

(52) U.S. Cl.
CPC ....... *H04N 21/47805* (2013.01); *H04N 21/812* (2013.01); *H04N 21/8133* (2013.01); *H04N 9/70* (2013.01); *H04N 5/2628* (2013.01)

(58) Field of Classification Search
CPC .......... H04N 21/4725; H04N 21/8586; H04N 21/858; H04N 1/64; H04N 21/234318; H04N 21/4622; H04N 21/4722; H04N 21/8547; H04N 21/4312; H04N 21/8153; G06F 17/30855
USPC ........................ 725/51, 60, 109, 110, 112, 113
See application file for complete search history.

(56) References Cited

U.S. PATENT DOCUMENTS

| | | | | |
|---|---|---|---|---|
| 7,120,924 | B1 * | 10/2006 | Katcher et al. .................. | 725/60 |
| 2002/0104096 | A1 * | 8/2002 | Cramer et al. ................ | 725/113 |

* cited by examiner

*Primary Examiner* — Hai V Tran
(74) *Attorney, Agent, or Firm* — Donn K. Harms

(57) ABSTRACT

A method for capturing viewer attention concerning a product depicted in a color motion video is provided wherein a frame in the plurality of image frames rendering the motion video on a display, is elongated. While elongated sections of the video frame showing products or services are highlighted and a user interface is provided to request information about or order the product.

4 Claims, 3 Drawing Sheets

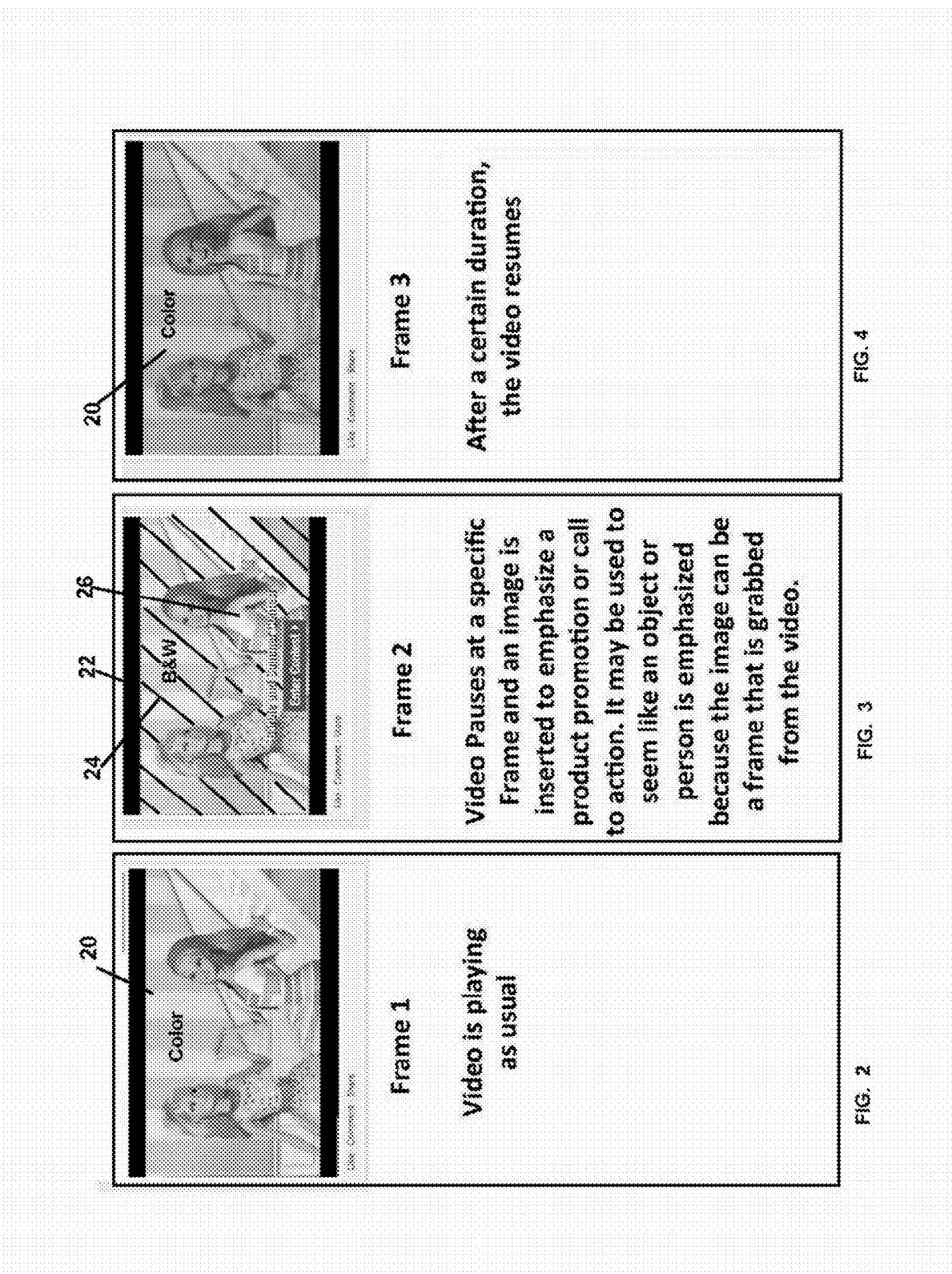

METHOD AND APPARATUS FOR INTERFACING BUYERS WITH PRODUCTS DEPICTED IN A VIDEO

BACKGROUND OF THE INVENTION

1. Field of the Invention

The invention herein disclosed relates generally to the field of display advertising and sales of products displayed. More particularly it relates to a system whereby a video, movie, commercial, or other remotely viewable entertainment or advertising video of moving video, functions as an advertisement in a manner adapted to catch the user's attention for a product or service by highlighting thereof to the attention of the viewing user.

2. Prior Art

The marketing of products through television advertisements and internet video and other streaming video to viewers, has become ever more prevalent with the maturing internet and the increasing number of internet and broadcast media channels. This visual marketing has increased exponentially with the advent of smartphones, pad computers, and wireless connections both through WiFi and cellular networks.

In broadcast media as well as streaming media over the internet, advertisements are conventionally broadcast during intermissions of a broadcast TV show or movie. Additionally advertisements are viewable by users over the Internet on the video screens of computers, as well as on television screens of users having Digital Video Recorders and the like.

While catalogs and static-photo advertising such as billboards, catalog pages, and display ads online, have been employed modernly to distribute knowledge about product lines and for advertising, the use of videos with commercials having moving actors or stories, is not widely employed for much but making users aware of certain products being advanced by the person or company providing the video.

For instance, video commercials may employ actors to show a product or service and invite users to call or visit retailers thereof. Movies and short entertainment videos have been known to purposely dress actors, or supply actors, with particular products to be viewed by movie goers and viewers of video to entice customers to seek them out subsequent to viewing the movie or video. In one noted instance the sales of, "Reese's Pieces" a candy, increased dramatically when shown in the movie "ET." Viewers of the movie sought out the product in stores subsequent to leaving the theaters. The company selling the candy paid a fee for placement of the candy in the movie.

The same is currently true for most products displayed in an advertisement video on television or the internet, as well as in feature films or in television programs and series. Viewers seeing a product or service, once made so aware of it, will generally seek out such products and services in stores or online should they find them attractive when made aware initially. Of course there is a lag-time between the viewer seeing their favorite athlete drink a specific drink, or use specific equipment, or wear particular clothing for example.

Of course the viewer's interest in a product or service seen in a movie or other video or other displayed media, but not being advertised, is passive. This is because the communicated media is not communicated with the intention to entice the viewer of a particular movie or video where a favorite actor may have been wearing designer dress or carrying a particular purse. It is this passive interest and the subsequent lag time in seeking the product or service after the viewer has viewed show or video, which can cause loss of interest, or just cause the user to forget their interest until the are reminded again upon viewing the item of interest.

In many cases viewers of video and movies are inattentive or not particularly ascertaining the presence of a particular product in the viewed frame. The viewer may be wrapped up on the plot of the video, or for instance may be talking on the phone while viewing and have divided attention. Thus, even products deliberately placed on actors and in scenes of a video or movie or other motion picture or television show, can easily not be discerned by potential buyers of such products as they are a small part of the moving depiction on the viewed screen, and the attention of the viewer may be distracted.

As such their exists a need for a method of depicting products in moving depictions on video displays of media such as television, computer screens, smartphones, and other media playing devices having display screens, which will immediately capture the attention of potential buyers who may be inattentive, or may not see the product of interest amongst the rest of the items and people depicted on the screen. Such a system should not interrupt the media such as a movie or video program being displayed to the user for periods of time where the viewer becomes irritated. However, such a system should employ the video display of the media itself, to deliberately draw the interest of a viewer momentarily, as a means to cause the viewer to become cognizant of a product or service being portrayed in the video display, for the purposes of soliciting interest or sales of the product or an interest in a service or the like.

Such a system should be user friendly and allow even the most inexperienced computer-user, to identify and order products and services to which their attention is momentarily drawn, in shown in a movie, tv show, video, commercial, or internet communicated video program.

Still further, such a service should be easily provided to the producers of such movies, videos, commercials, and other such viewed media, through an interface that will allow the user or viewer of the products and services to which they have become cognizant, to order or seek more information therefor.

Such a system should be configured to allow for employment of the user interest highlighting method, during the communication of videos and movies and advertisements, to users across a network such as the internet, whether run from a remote server or the user's computer.

With respect to the above, before explaining at least one preferred embodiment of the method for advertising and sales using media herein in detail or in general, it is to be understood that the invention is not limited in its application to the details of employment and to the arrangement of the components or the steps set forth in the following description or illustrated in the drawings. The various apparatus and methods of the herein disclosed invention for providing a means to cause a user to become cognizant of products and services in media for advertising and sales purposes, is capable of other embodiments, and of being practiced and carried out in various ways, all of which will be obvious to those skilled in the art once the information herein is reviewed.

Also, it is to be understood that the phraseology and terminology employed herein are for the purpose of description and should not be regarded as limiting. As such, those skilled in the art will appreciate that the conception upon which this disclosure is based may readily be utilized as a basis for other media enhancement employed as a means for causing a viewer to become cognizant of a product or service for advertising and sales thereof. It is important, therefore, that the embodiments, objects and claims herein, be regarded as including such equivalent construction and methodology insofar as they do not depart from the spirit and scope of the present invention.

SUMMARY OF THE INVENTION

The disclosed system herein, provides a method of momentarily gaining user attention for a product or service or other item, within the depiction of media being viewed by the viewer watching videos, movies, commercials, streaming video, and other digital video media which is displayed for viewing by viewers. Once viewer attention is gained and they have been made cognizant of the presence of the product or service, an easy to operate ordering electronic system for purchasing or requesting information concerning the products and services may also be provided in a graphic interface.

The system employs software adapted to the task, to cause the pixels of a product or service or depicting all or part of a person or character on the display screen, to momentarily become highly visible, relative to surrounding pixels in the displayed media. This operates as a means to cause the viewer to be cognizant of a product or service displayed in the media, even inattentive viewers of the displayed media.

Video media of moving pictures such as movies in a theater and on television or a display screen of a computer, presents the illusion of motion to the human brain by depicting individual frames, at a particular speed per second. This sequential depiction is known as frame rate or frame frequency or frames per second (FPS). FPS is the frequency (rate) at which an imaging device, such as a video display or television, produces unique consecutive images called frames on the viewing screen. The term applies equally well to film and video cameras, computer graphics, and motion capture systems. Frame rate is most often expressed in frames per second (FPS) and is also expressed in progressive scan monitors as hertz (Hz) and more recently in such standards as 24p, 25p, and 30p in digital standards for digital Televisions and movie theaters.

It is known that the human eye and its brain interface, or the human visual system, can generally process 10 to 12 separate individual images per second, in order to perceive each image individually. It is also known that the threshold of human visual perception, varies depending on what is being measured. When looking at a lighted video display, people begin to notice a brief interruption of darkness, if such darkness persists for about 16 milliseconds or longer. Experiments in recent years have shown that observers can recall one specific image in an unbroken series of different images, where each of which lasts as little as 13 milliseconds. Other experiments in recent years have shown that when given very short single-millisecond visual stimulus on a display, viewers thereof report a perception of such stimulus at a duration of between 100 ms and 400 ms. This has been explained as being due to persistence of vision by the cells perceiving the image in the visual cortex as well as by the receptors in the eye being slightly overloaded. This may cause images perceived in this duration, to appear as one stimulus, such as a 10 ms green flash of light immediately followed by a 10 ms red flash of light, being perceived as a single yellow flash of light. It is this visual cortex persistence of vision which may also create an illusion of continuity. This illusion in the brain allows a perceived sequence of still images on a video display or movie screen, to give the impression of motion. This occurs even when the image is not projected, for example when the pages of cartoon book are thumbed through quickly, and the sequential stationary images thereon appear to move.

Experimentation for this application has shown that when a viewer sees video on a video display which the brain perceives as moving, a short change or delay in the displayed images of a single frame, in which some object or person or part of the displayed frame appears out of context with the previously displayed video images, which were displayed a normal FPS or frames per second, the changed single image immediately captures the viewer's attention. Further the above noted persistence of vision in the cells of the eye receptors and visual cortex, makes the out of context image appear longer in the brain, than it is really displayed.

Additionally, because the human eye has a very narrow focus for objects and things in the central area of vision, a separate channel of communication from the eye to the brain has developed to process images moving in the periphery of what is being viewed by the user. An example of such is when a person is talking with another person, and out of the corner of their eye, they perceive a moving object, which causes them to look in that direction. This is believed to have developed over time as a defense mechanism that is hard-wired to the human brain. Perceived perifial movement causes an instant attention shift from what is being viewed in a central area of vision, to a glance as to what is perceived as moving or could be a threat in the peripheral vision.

Experimentation has found that this hard wired reaction can also be employed, to shift the focus of an inattentive viewer of video being displayed, or a distracted viewer such as a person talking on the telephone while watching television. This shift of focus causes the inattentive viewer to shift their focus of attention and central vision directly to the video screen. The method herein by delaying the timing of a frame of the video being depicted from the normal FPS, and also changing the coloration or the brightness of a particular person or product or thing in the perceived frame of the displayed video, that a human watching the display screen directly, or indirectly with peripheral vision, will immediately respond to the unexpected change in context of the area of the display, by focusing a majority of their attention on what is being depicted on the display which is out of context in color, speed, brightness, to the rest of the frame being depicted.

As noted, this change in what the brain perceives as normal and expected or unthreatening, as a threat response or as just a shift in focus promoted by the change in FPS and other contextual frame factors, is a hard-wired response in the brain. Thus, it will momentarily capture the direct attention of attentive viewers or inattentive viewers who have the display centrally positioned in their view, or where the display is in the periphery of their view.

Further, due to the above noted persistence of vision in the visual cortex, the out of context area of the displayed image is perceived as being displayed longer, and with the viewers attention focused thereon, the highlighting of a product or object, or person, in the displayed media out of context in time and display factors from the previous perceived moving display, is perceived and remembered.

Additionally, because the brain of the viewer will immediately focus on what is perceived as out of the ordinary or expected in displayed media on a video display, and because in most instances it elicits an alerting response, the viewer's reflexes are momentarily focused to react to what is perceived as "changed" in the displayed frame, from the previously displayed frames, which were perceived as movement. This reflex once elicited by the method herein, may continue to be employed to allow the user the choice to continue to maintain the frame displayed on the screen using an available control. Thereafter they can be provided means to actually order or seek more information on the perceived product or object or person, by employment of a provided available graphic interface.

For instance by momentarily stopping the FPS of images, with a delayed single frame or plurality of frames, and dulling or changing background depicted pixels to grayscale, behind a known actor wearing clothing or carrying a purse which is maintained in the same colorization as the previous frames, the visual "memory" of color perceived by the color receptors of the eye, will see what remains in proper colorization as normal. Concurrently due to what is best described as overload in the color receptors of the eye for previously perceived colors in the now grayscale area, the viewer will actually see in their brain, a momentary negative color image for what is now shown grayscale.

This change to the background colorization to take advantage of negative color communicated from color eye receptors to the brain, as a means to place out of context and highlight the desired product or image in the delayed frame presented to the viewer, instantly focuses the viewer's attention on what is being shown in normal colorization, and perhaps rendered slightly brighter than the grayscale background.

Thus, with the viewer in alert due to changes in what was previously perceived as normal, and given a means to activate or employ a graphic interface with what is depicted in the delayed frame in color or other highlighted mode, and additionally being presented with added indicia on the display screen with pricing and acting as graphic button to activate to order, the user may purchase the product, object, or service being highlighted in their perception, or request more information thereon.

If the viewer chooses to employ the graphic interface during the elongated display of the video frame mentally highlighting the product or service, then the ongoing program or video being shown on their display screen will temporarily cease while the transaction is completed. Once interaction by the viewer ceases through completing an ordering process, or using the graphic interface to terminate the process, or a duration of time, the program or video or other media depicted on the display, which in the interim has been ported to electronic memory, will again begin to run normally. Such steps will be initiated and provided by software running on a computer which is adapted to the task of changing the context of the viewed media, and providing the interface to order or to continue normally with the displayed media.

This method for altering the context of displayed video relating to a product or service relative to surrounding displayed video and/or previous frames displayed of the media and achieving viewer attention for a product or service or object or person displayed during an ongoing depiction communicated to a video display by delaying a frame thereof during the normal FPS depiction, and highlighting pixels in areas of the display to focus the viewer attention, can be repeated during programs or streaming video or movies or other video media watched by viewers.

In operation, software running in the background and providing the images depicted on the screen of the viewer will have in electronic memory the location of the outline of those pixels and the pixels inside the outline, as well as the pixels providing the user interface for action, and will operate based on resulting viewer actions, to either pause the frames being displayed while an order is placed or terminated, or once a determined amount of time for the display of the single frame has elapsed, the software will cause the communication of displayed frames of video to the viewer video display screen at a normal rate and colorization to be perceived as motion pictures to the brain of the user.

In a simple mode of the device and method, the user interface to order or inquire may operate by providing for the employment of a mouse or pointing device to place a cursor on the perceived highlighted portion of the display rendering a product, service, person, or other matter sought to be communicated to the viewer, and the viewer allowed to activate the cursor in that position to start the software routing for ordering or requesting information. During the routine indicia may be added to the display giving instructions or providing the user a target for the cursor activation to complete the process.

The operator of the system herein, would have a secure server in communication with the viewer's display and computing interface, to operate the cursor or other onscreen designator which may be employed by the viewer. Subscribing advertisers to the operator of the system, will be provided user orders or requests for information from their employment of the interface depicted on the delayed frame on the viewer's video display, and may then provide the product, service, information, or other matter requested by the viewer. Alternatively, the viewer may be directed to and connected by the server, to the subscribing advertiser's ordering site, wherein video depictions with a graphic interface will be communicated to the viewer's video display for completion of the order or request process by the viewer.

With respect to the above description, before explaining at least one preferred embodiment of the method of focusing viewers of displayed media on a portion of the screen to elicit interest or ordering using a provided graphic interface, allowing viewers to employ the graphic interface to buy or receive information about a product or service, it is to be understood that the invention is not limited in its application to the details of operation nor the arrangement of the components or steps set forth in the following description or illustrations in the drawings. The various methods of implementation and operation of the method herein are capable of other embodiments and of being practiced and carried out in various ways which will be obvious to those skilled in the art once they review this disclosure. Also, it is to be understood that the phraseology and terminology employed herein are for the purpose of description and should not be regarded as limiting.

Therefore, those skilled in the art will appreciate that the conception upon which this disclosure is based may readily be utilized as a basis for designing of methods and systems for carrying out the several purposes of the present method to perceive products or services during a paused video frame, and act thereon. Therefore, that the objects and claims herein should be regarded as including such equivalent construction, steps, and methodology insofar as they do not depart from the spirit and scope of the present invention.

Further objectives of this invention will be brought out in the following part of the specification wherein detailed description is for the purpose of fully disclosing the invention without placing limitations thereon.

It is an object of this invention to provide a method for capturing the attention of viewers of displayed media momentarily to give them the option of employing a graphic interface to continue a process of ordering or requesting information concerning a product or service.

It is another object of this invention to provide such a system which will alter the video FPS display momentarily with a single frame which has been altered for color and/or brightness in areas of pixelation, to cause the viewer to immediately focus on a provider-designated area to interest the viewer.

It is another object of this invention, to provide a graphic interface employable by the viewer if they so choose during the depiction of the single frame for an elongated time period.

These together with other objects and advantages which become subsequently apparent reside in the details of the construction and operation of the system herein as more fully hereinafter described and claimed, reference being had to the accompanying drawings forming a part thereof, wherein like numerals refer to like parts throughout.

BRIEF DESCRIPTION OF DRAWING FIGURE

FIG. 2 is a depiction of displayed media on a viewing screen of a viewer being presented at a normal frame per second rate in continuous colorization of pixels on all areas of the display.

FIG. 3 shows the single frame of the system herein, being shown for a delayed period of time, with the striped are representing areas of the display altered for color and/or brightness and/or size (such as zooming into a portion) and out of context from that of previous frames, with areas desired to focus viewer's attention appearing normal or appropriately colored, relative to the previous frames presented.

Figure 1:
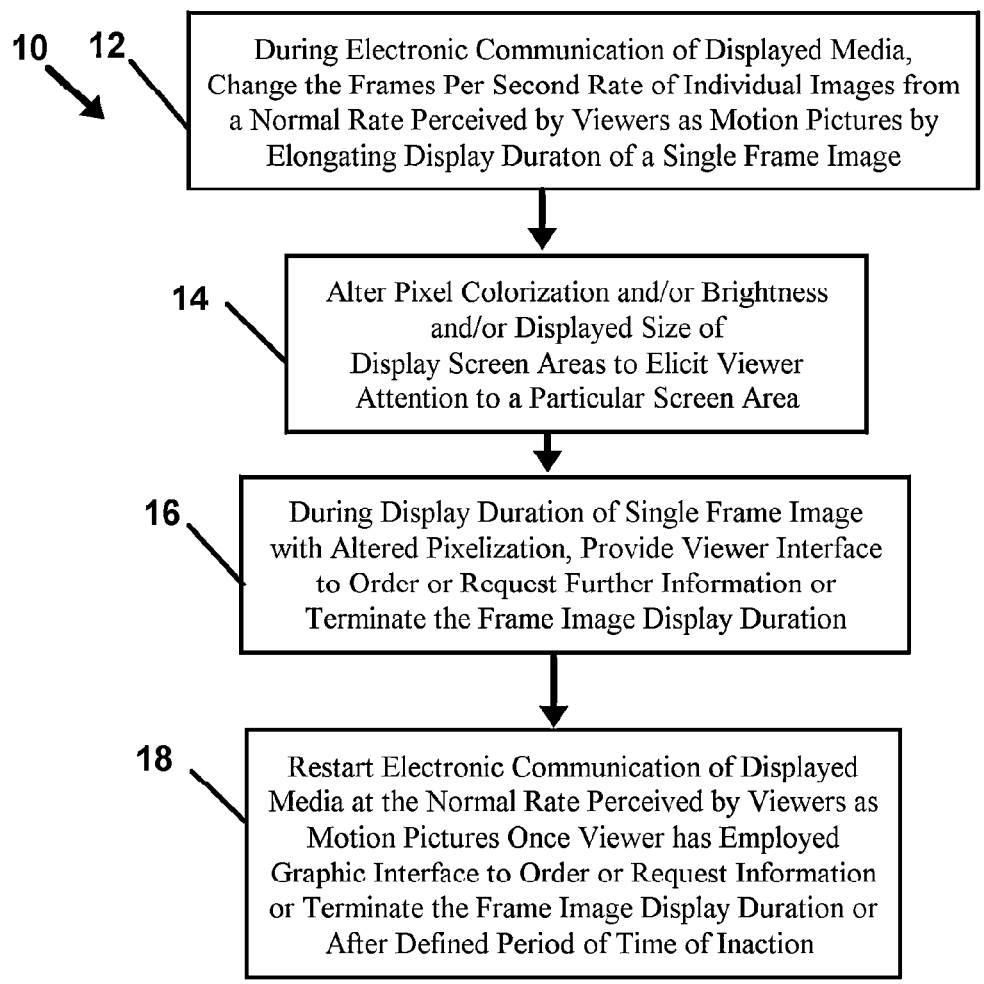
FIG. 1 shows a flow chart of the method and system herein.

FIG. 4 depicts the displayed media proceeding at a normal frame per second rate in the same colorization of all pixels as that of FIG. 1 once the viewer completes a presented process using a graphic interface, or a time period for display of the frame of FIG. 2 elapses.

Figure 5:
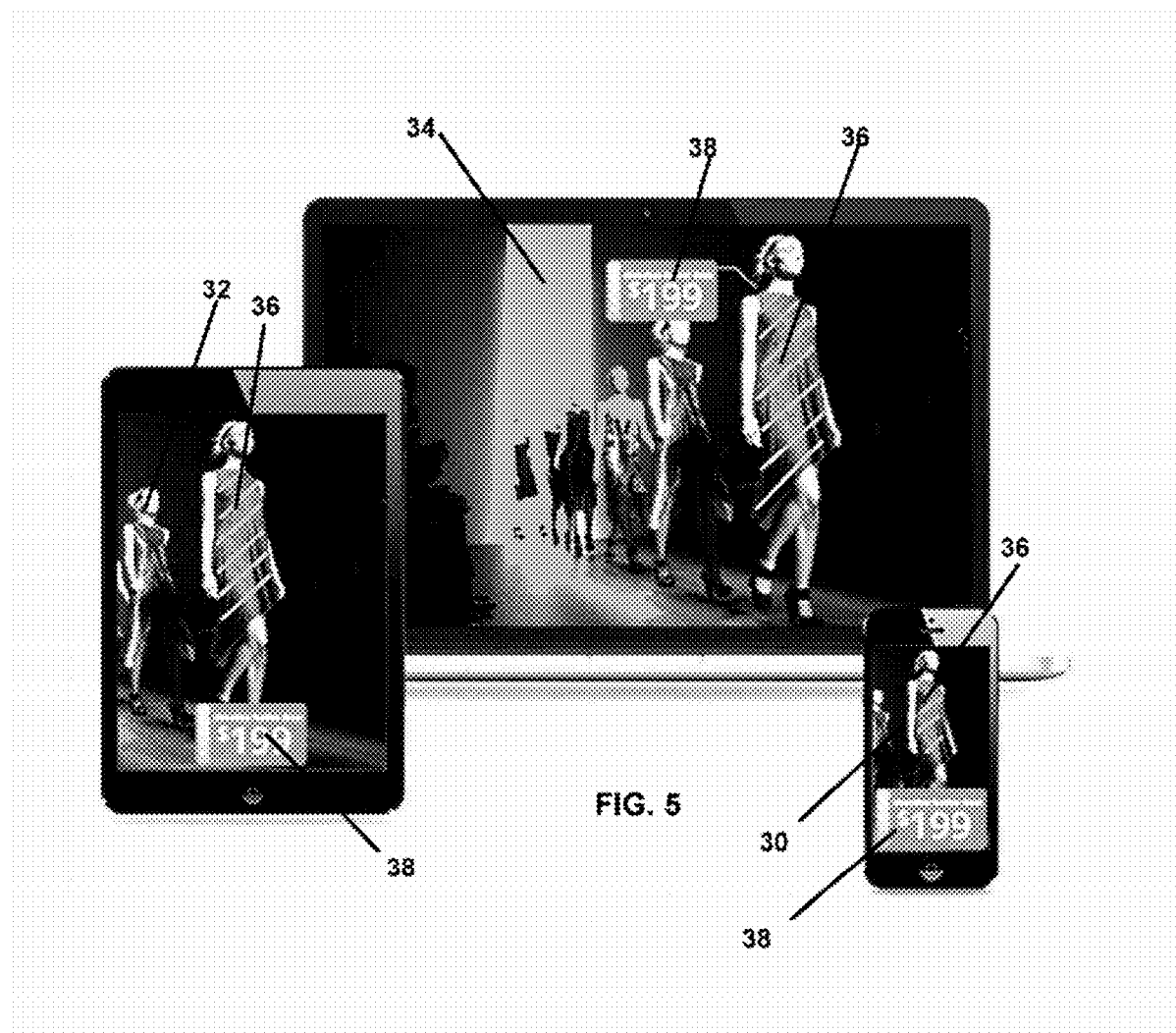

FIG. 5 shows the delayed frame of displayed media of the system being presented on any video display screen with a computer interface such as a smart phone, pad or laptop computer, or smart TV with the striped portion indicating the area depicted to attract viewer attention.

DETAILED DESCRIPTION OF THE PREFERRED EMBODIMENTS OF THE INVENTION

Referring now to the method and system herein shown in simple format by the depictions of FIGS. 1-5, FIG. 1 depicts a flow chart of the method of the system 10 herein, in a preferred mode of the system 10.

In a first step 12, during the electronic communication of the data configured to generate the frames per second of displayed media on a user display screen as motion at a normal rate between 20 to 30 frames per second, the frames per second rate of the individual images is changed from this normal rate perceived by viewers as motion or moving pictures. This change in frame rate is accomplished by elongating a display duration of a single frame image to a time frame from one half a second to ten seconds, as a means to elicit the attention-getting response of the viewer to a perceived change in motion or colorization or other pixelation features.

In a next step 14, during the frame rate change, the single frame being displayed to the viewer is altered in context from the immediately preceding frames viewed by altering one or a combination of pixel colorization, brightness, or the displayed size of the frame itself to zoom to an area, as a means to elicit a focusing of viewer attention by the perceived change from the display of media of the previous screen. As noted, the reflex reaction of the eyes where previous colored pixels on the display are immediately changed to grayscale, has been found in experimentation to cause a negative version of the image of the previous colors to be communicated to the brain. By maintaining the same colors in areas of the displayed image to that of previous images, the viewer sees that image normally, but surrounded by the momentarily negative image in the grayscale areas surrounding the portion of the depicted image which the service provider wishes to focus the viewer's attention upon for paying subscribing advertisers. Additionally the area of interest in normal colorization can optionally be an image zoomed slightly from the size of the previous images in the perceived motion picture of the viewer, to make the area of pixels seem to rise above the screen relative to the grayscale areas appearing momentarily in negative color and the area to be focused for interest appearing to be surrounded by such. It should be noted that reversing this process by leaving the background in normal color, and making the product or service highlight to grayscale, did not have the same effect when tested on viewers and did not work nearly as well as the grayscale surrounding pixels and normal colorization of the area of the screen where the product or service of interest is positioned.

In a subsequent step 16, during the time duration of the single frame image which is longer than that of normal frames per second imaging perceived by the viewer as motion pictures, a graphic interface may be communicated to the display screen of the viewer in a networked communication from the server of the system provider which is running software adapted to this communication. This graphic interface may also be employed for use to allow the user to order or request further information or terminate the duration of the depicted frame image, which as noted has been altered to focus user attention on a product or service or person or other matter.

In a further step, 18, the system provider of the communicated displayed media, will employ software adapted to the task and running on the server or a computer in communication therewith, to restart the electronic communication of the displayed media causing the normal rate of individual frames per second perceived by viewers as motion pictures once the viewer has employed the graphic interface to order or request information or indicated a wish to terminate the frame image display duration. Alternatively software running on the provider's server or a connected computer or on the device of the viewer communicating the video depictions to the video display can terminate the frame image display duration after a defined period of time of inaction by a viewer.

FIG. 2, displays an example of normal displayed media 20 on a video display screen. In normal operation thereof, a viewer is presented at a normal frame per second rate, in continuous colorization of pixels on all areas of the display.

Shown in FIG. 3 is the single frame 22 of the system herein, being shown for an elongated period of time relative to the normal frames per second of displayed media 20 of FIG. 2. The striped area 24 depicts areas of the display altered for color which are changed to grayscale. Other alternations of the displayed media can include changes in brightness and/or size (such as zooming into a portion) from that of previous frames, of the areas on which to direct viewer's attention 26, and/or also rendering them to appear normal or appropriately colored, relative to the previous frames presented of displayed media 20.

FIG. 4 depicts the displayed media 20 proceeding at a normal frame per second rate in the same colorization of all pixels as that of FIG. 2 once the viewer completes a presented process using a graphic interface, or a time period for display of the frame of FIG. 3 elapses.

FIG. 5 shows the delayed frame of displayed media of the system being presented on any video display screen with a computer interface such as a smart phone 30, pad or laptop computer 32, or smart TV 34. The striped portion 36 indicates the area of the displayed video depicted to attract viewer attention in the fashion noted above with surrounding grayscale or other means to alter the surrounding pixels. Also shown are the graphic interface area 38 of indicia which allows the user to employ a pointing device or cursor control device to order or request information or terminate the image delay.

While all of the fundamental characteristics and features of the system for allowing capturing a viewer's attention and allow ordering or requesting information concerning products or services during a displayed media perceived as motion pictures, has been shown and described herein, with reference to particular embodiments thereof, a latitude of modification, various changes and substitutions are intended in the foregoing disclosure and it will be apparent that in some instances, some features of the invention may be employed without a corresponding use of other features without departing from the scope of the invention as set forth. It should also be understood that various substitutions, modifications, and variations may be made by those skilled in the art without departing from the spirit or scope of the invention. Consequently, all such modifications and variations and substitutions are included within the scope of the invention as defined by the following claims.

What is claimed is:

1. A method of capturing viewer attention concerning a product depicted in a color motion video comprised of a plurality of sequentially displayed color image frames displayed on a video display at a rate of between 15 to 60 frames per second, comprising the steps of:

elongating a duration of time of display of a chosen image frame from said plurality of image frames sequentially displayed color image frames, to display for an elongated period of display of said chosen image frame;

during said elongated period of display of said chosen image frame, continuing to render a first portion of said chosen image frame, which depicts a product or service, as a color rendering;

slightly enlarging only said first portion of said chosen image frame from its size in an immediately previously displayed image frame of said plurality of sequentially displayed color image frames displayed on said video display;

during said elongated period of display, rendering a second portion of said chosen image frame, adjacent to or surrounding said first portion, in grayscale;

during said elongated period of display, depicting a graphic interface on said display configured to allow said viewer to input a signal indicating an interest in said product or service depicted within said first portion of said chosen image;

if a said signal is input, communicating to said viewer a graphic interface providing a means to request information or purchase said product or service; and if said signal is not input, upon cessation of said elongated period of display, resuming said motion video comprised of a said plurality of sequentially displayed color image frames.

2. The method of claim 1, additionally comprising the step of:

altering pixel coloration or brightness of said first portion of said color rendering during all or part of said elongated period of display thereof.

3. The method of claim 1, additionally comprising the step of:

configuring said graphic interface to allow said viewer to input a second signal to terminate said elongated period of display of said chosen image frame.

4. The method of claim 2, additionally comprising the step of:

configuring said graphic interface to allow said viewer to input a second signal to terminate said elongated period of display of said chosen image frame.

* * * * *